G. R. RADLEY.
MOTOR CONTROLLER.
APPLICATION FILED OCT. 2, 1911.
1,119,987.
Patented Dec. 8, 1914.
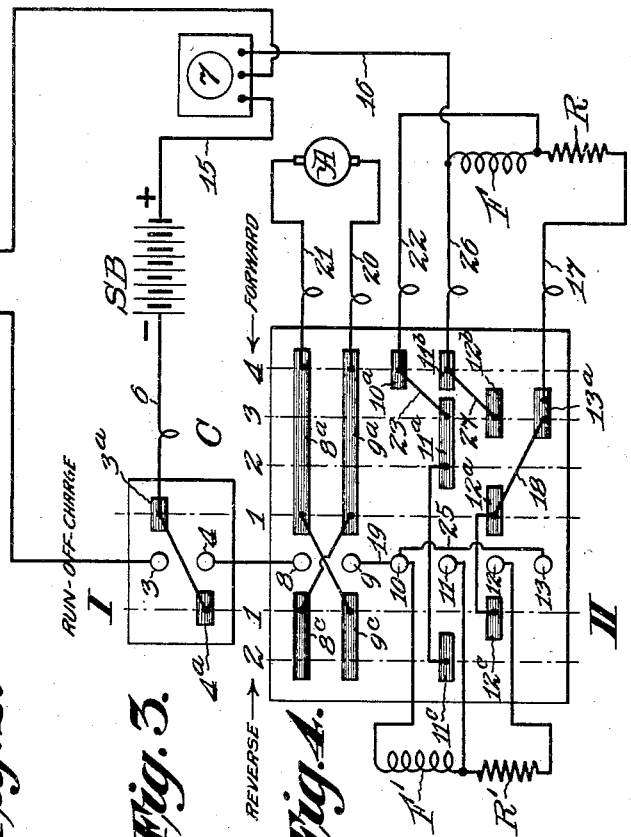
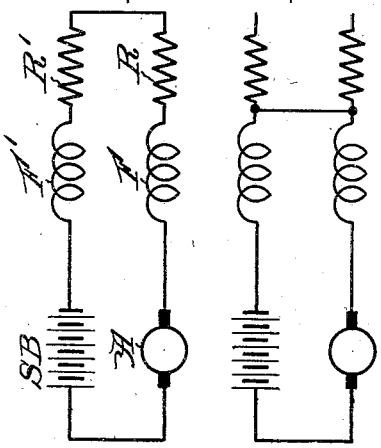
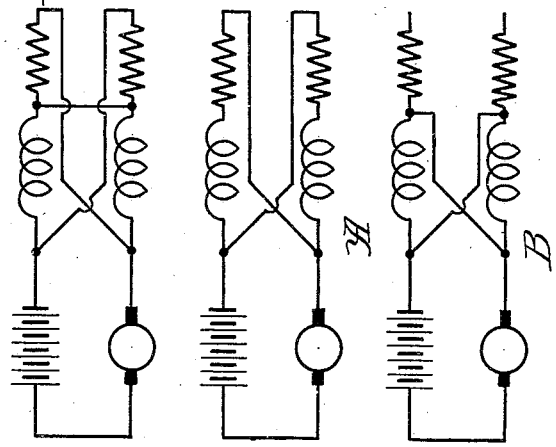
Witnesses:
Inventor:
Guy R. Radley.
By Edwin B. H. Tower, Jr.
atty.

UNITED STATES PATENT OFFICE.

GUY R. RADLEY, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,119,987. Specification of Letters Patent. Patented Dec. 8, 1914.

Application filed October 2, 1911. Serial No. 652,407.

*To all whom it may concern:*

Be it known that I, GUY R. RADLEY, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to a method and means for controlling electric motors.

It is one of the objects of my invention to provide a method and means for connecting the field windings of an electric motor either in series or parallel relation and to accomplish the transition from one relation to the other without interruption of the motor circuit and without excluding either field winding therefrom.

Various other objects and advantages of my invention will be hereinafter clearly and fully set forth.

For the purpose of clearly and fully setting forth the nature and characteristic features of my invention, I shall describe the controller diagrammatically illustrated in the accompanying drawing which embodies my invention in its preferred form. It should be understood however, that my invention is not limited to the specific embodiment thereof illustrated.

In the accompanying drawings:—Figure 1 is a diagrammatic view of the controller and Figs. 2, 3, 4 and 5 are diagrammatic views showing the different circuit connections established by movement of the controller illustrated in Fig. 1 to different positions.

The controller selected for the purpose of illustration is particularly applicable to the control of electrically operated vehicles, but might of course be used for various other purposes.

The motor illustrated includes an armature A and two series field windings F and F'. The motor is supplied with current from a storage battery S B through a suitable controller C hereinafter fully and clearly described. Resistances R and R' are also provided for a purpose hereinafter set forth.

As above set forth it is one of the objects of my invention to change the relation of the field windings from series to parallel or vice versa without interrupting the motor circuit and without excluding either field winding therefrom. The controller illustrated will readily accomplish this object, but before describing the same, I shall briefly set forth my preferred method of accomplishing the object.

According to my preferred method I first connect the armature A, series field windings F and F' and resistances R and R' all in series across the terminals of the storage battery. The motor will thus operate as an ordinary series motor both field windings being connected in series. The resistances R and R' are used under these conditions for limiting the flow of current in the motor circuit for the well-known purpose.

After establishing the connections just described I establish a direct connection from one field winding to the other to short circuit the resistances R and R'. At the same time or immediately thereafter, I break the connection between the right hand terminals of the resistances. Fig. 3 shows the connections thus obtained. Under these conditions the field windings remain in series, but with the resistances excluded, thereby permitting a greater flow of current in the motor circuit and in consequence increasing the speed of the motor. Of course in practice the resistances need not be included in the motor circuit up to this time if not desired. I then make the cross connections shown in Fig. 4, at the same time maintaining the connections shown in Fig. 3. The cross connections briefly described connect the right hand terminal of resistance R with the left hand terminal of field winding F' and the right hand terminal of resistance R' with the left hand terminal of the field winding F. Under these conditions the field windings remain in series but with one section of resistance in parallel with each winding and in series with the other winding. This increases the speed of the motor.

To secure the parallel relation of the field windings, I first interrupt the direct connection between the field windings as shown in diagram A Fig. 5, thereby interrupting the series connection between the field windings. This leaves the field windings in parallel with a resistance in series with each. I then immediately exclude these resistances from circuit obtaining an increased speed through the parallel connection of the windings.

The change from parallel to series relation is accomplished in just the reverse order to that above described. It will thus be seen that the above described method provides for readily changing the field windings from series to parallel relation or from parallel to series relation without interrupting the motor circuit and further without disconnecting either field winding from circuit or short circuiting either field winding. It will further be observed that the foregoing method provides for a very gradual change in the electrical conditions of the motor circuit through the medium of the resistances which are cut in and out and changed from series to parallel relation or vice versa as the successive changes in the motor circuit are made. This fully protects the motor against electrical shocks and in consequence protects the driven mechanism against mechanical shocks.

I shall now describe the controller illustrated in Fig. 1. This controller is shown schematically as provided with two sections I and II. The section I is movable independently of the section II for establishing charging connections and for connecting one of the contacts of section II of the controller to the battery for running. The section II of the controller is adapted to be moved to different positions to establish the motor connections heretofore described.

The section I of the controller comprises stationary contact fingers 3 and 4 and contact segments 3ª and 4ª adapted to engage said contact fingers 3 and 4 respectively. It may be assumed that the contact segments 3ª and 4ª are mounted upon a movable drum having three positions, to-wit a central off position in which position the segments 3ª and 4ª are out of contact with their respective fingers, a charging position in which the contact segment 3ª engages contact finger 3 and a running position in which segment 4ª engages finger 4. The finger 3 is connected to one side of a charging circuit 5, while the segment 3ª is connected by a flexible lead 6 to one terminal of the storage battery. Thus assuming the section I of the controller to be in the charging position, current would flow from the positive line of the charging circuit to the positive side of the battery, through the battery by conductor 6, segment 3ª and finger 3 to the negative side of the charging circuit. In the charging circuit I have schematically illustrated an ampere hour meter 7 which is also common to the discharging circuit. Of course in practice any preferred measuring instruments may be connected in the two circuits. The contact segments 3ª and 4ª are electrically connected while the contact finger 4 is connected to a contact of section II of the controller. Hence when section I of the controller is in running position, circuit will be closed from the negative side of the storage battery to the controller II.

The controller II comprises a series of stationary contacts 8, 9, 10, 11, 12 and 13. These contacts are adapted to be engaged by two sets of contact segments which it may be assumed are mounted upon a drum adapted to be moved in opposite directions from a central off position to bring either set of segments into engagement with said contacts. It may further be assumed that the drum has four positions in one direction which we will term "forward" and two positions in the opposite direction which we will term "reverse." The forward contact segments include segments 8ª and 9ª, adapted to engage contacts 8 and 9 in all forward positions of the controller; a segment 10ª adapted to engage contact 10 in the fourth forward position; segments 11ª and 11ᵇ, the former to engage contact 11 in the second and third forward position, and the latter to engage contact 11 in the fourth forward position; segments 12ª and 12ᵇ, the former adapted to engage contact 12 in the first forward position and the latter to engage contact 12 in the third forward position; a segment 13ª adapted to engage contact 13 in the third forward position. The reverse segments include segments 8ᶜ and 9ᶜ adapted to engage contacts 8 and 9 in both reverse positions, a contact segment 11ᶜ adapted to engage contact 11 in the second reverse position, and a contact segment 12ᶜ adapted to engage contact 12 in the first reverse position.

I shall now describe the operation and functions of the controller, at the same time clearly and fully setting forth the circuit connections therefor. For the purpose of this description let it be assumed that the section I of the controller is in running position and that section II of the controller is moved to the first forward position. Circuit will thereupon be established from the positive side of the storage battery by conductor 15 through the ampere hour meter 7 by conductor 16 through the series field winding F and resistance R, flexible conductor 17 to segment 13ª of the controller by conductor 18 to segment 12ª, contact 12 resistance R′, series field winding F′, conductor 19, contact 9, contact segment 9ª, flexible conductor 20 through the motor armature, flexible conductor 21 to segment 8ª, contact 8, contact 4 of the controller, section I, segment 4ª to segment 3ª by conductor 6 to the negative side of the storage battery. This completes the motor circuit as illustrated in Fig. 2 before described in which the motor armature, both field windings and both resistances are connected in series across the terminals of the storage battery.

Assuming now that the controller be moved to the second forward position the resistances R and R' will be short circuited, said short circuit extending from a point between field winding F and resistance R by flexible conductor 22 to segment 10ᵃ by conductor 23 to segment 11ᵃ, contact 11 to a point between field winding F' and resistance R'. Also by virtue of the contact 12ᵃ disengaging the contact 12 the connection between the lower terminals of the resistance sections R and R' will be interrupted. This position of the controller accordingly gives the circuit connections shown in Fig. 3.

Assuming now that the controller be moved to the third forward position, the following additional circuits will be completed: first, from the lower terminal of resistance R by conductor 17 to segment 13ᵃ, contact 13, conductor 25, contact 10 to the upper terminal of series field winding F'. This establishes one of the cross connections of Fig. 4 before referred to. The other cross connection is established from the upper terminal of the field winding F by flexible conductor 26, segment 11ᵇ by conductor 27 to segment 12ᵇ, contact 12, to the lower terminal of resistance R'. As will be seen from the drawing the segment 11ᵃ which completes the direct connection between the field windings overlaps the segment 12ᵇ, and in consequence maintains the circuit connections shown in Fig. 3. Thus this position of the controller gives the connections shown in Fig. 4.

During movement of the controller to the fourth position segment 11ᵃ leaves contact 11, thereby interrupting the series connection between the field windings. This gives the circuit connections shown in diagram A Fig. 5. Also during movement to the fourth position segments 12ᵇ and 13ᵃ leave contacts 12 and 13 and contacts 10ᵃ and 11ᵇ engage contacts 10 and 11 respectively. This results in connecting the lower terminal of field F by conductor 22, segment 10ᵃ to contact 10 and accordingly to the upper terminal of field winding F' and also in connecting the upper terminal of field winding F by conductor 26, segment 11ᵇ, contact 11 to the lower terminal of field F'. Thus the two field windings are connected in parallel with the resistances R and R' excluded from circuit, giving the connections shown in diagram B Fig. 5. It will thus be seen that movement of the controller in the forward direction fully carries out the method heretofore described, establishing all of the connections desired.

When the controller is moved in the first reverse position it establishes the same connections as those established upon the first movement in the forward direction except that it reverses the flow of current through the motor armature and accordingly causes the motor to operate in the opposite direction. When moved to the second reverse position the controller makes the same changes in connections that it makes in the second forward position, that is to say it short circuits the resistances R and R'. No provision is made for changing the field connections upon the reverse movement of the controller, as such changes are ordinarily entirely unnecessary. It should be understood however, that the reverse side of the controller might be made an exact duplicate of the forward side and thus produce all of the variations heretofore described if desired.

While I have shown numerous of the segments connected by conductors, it should be understood that all or any number of the segments might be mounted upon a conducting frame so that no special connections would be required.

What I claim as new and desire to secure by Letters Patent is:—

1. The method of changing the relation of motor field windings from series to parallel consisting in establishing parallel connections for the field windings prior to interruption of the series connection, placing resistances in said parallel connections to prevent short circuiting of either field winding and then interrupting the series connection of the field windings.

2. The method of changing the relation of motor field windings from series to parallel, consisting in connecting a resistance in series with each winding and in parallel with the other winding while said windings remain connected in series and then interrupting the series connection.

3. The method of changing the relation of motor field windings from series to parallel relation or vice versa consisting in providing both a series connection and a parallel connection including a resistance in series with each winding and in parallel with the other winding prior to the change in relation of the windings and then interrupting either series or parallel connections to give the desired relation of the field windings.

4. In combination, an electric motor having a plurality of field windings and a series-parallel controller therefor including resistances and means operable for connecting each of said resistances in series with one of said windings and in parallel with another of said windings while the series connection of said windings is maintained and subsequently interrupting the series connection of said windings.

5. In combination, an electric motor provided with a plurality of field windings, means for connecting said field windings in either series or parallel relation without interruption of the motor circuit and resistances connected in circuit by said means to prevent short-circuiting of either of said windings during transition from one relation to the other.

6. The combination with an electric motor having two series field windings, of two resistances each having a terminal permanently connected with a terminal of one of said field windings, and a drum controller comprising six contact segments electrically connected in pairs and four contact fingers coöperating therewith, said pairs of contact segments having three flexible connections to the terminals of one of said field windings and its corresponding resistance and said contact fingers having three connections to the terminals of the other of said field windings and its corresponding resistance, and two of said contact fingers being electrically connected, whereby said segments and fingers may be engaged to establish either series or parallel connections for said field windings.

In witness whereof, I have hereunto subscribed my name in the presence of two witnesses.

GUY R. RADLEY.

Witnesses:
  FRANK H. HUBBARD,
  GEO. DAYNIE.